United States Patent
Soubaras

(10) Patent No.: US 9,322,943 B2
(45) Date of Patent: Apr. 26, 2016

(54) METHOD AND APPARATUS FOR PRE-STACK DEGHOSTING OF SEISMIC DATA

(71) Applicant: CGGVERITAS SERVICES SA, Massy (FR)

(72) Inventor: Robert Soubaras, Orsay (FR)

(73) Assignee: CGGVERITAS SERVICES SA, Massy (FR)

( * ) Notice: Subject to any disclaimer, the term of this patent is extended or adjusted under 35 U.S.C. 154(b) by 416 days.

(21) Appl. No.: 13/894,036

(22) Filed: May 14, 2013

(65) Prior Publication Data

US 2013/0308420 A1   Nov. 21, 2013

Related U.S. Application Data

(60) Provisional application No. 61/648,689, filed on May 18, 2012.

(51) Int. Cl.
   *G01V 1/38* (2006.01)
   *G01V 1/28* (2006.01)
   *G01V 1/36* (2006.01)

(52) U.S. Cl.
   CPC ............ *G01V 1/282* (2013.01); *G01V 1/366* (2013.01); *G01V 1/38* (2013.01); *G01V 2210/56* (2013.01)

(58) Field of Classification Search
   CPC ........... G01V 1/36; G01V 1/366; G01V 1/38; G01V 1/282; G01V 2210/56
   USPC ........................................................ 367/24
   See application file for complete search history.

(56) References Cited

U.S. PATENT DOCUMENTS

| 4,992,992 A | 2/1991 | Dragoset, Jr. |
| 2008/0165618 A1 | 7/2008 | Robertsson |
| 2011/0305109 A1 | 12/2011 | Soubaras |
| 2012/0092956 A1 | 4/2012 | Soubaras |
| 2013/0163376 A1* | 6/2013 | Poole ........................ G01V 1/28 367/24 |

FOREIGN PATENT DOCUMENTS

| FR | 2955397 | 7/2011 |
| WO | 2011/085827 A1 | 7/2011 |

OTHER PUBLICATIONS

British Search Report mailed Nov. 18, 2013, in related British Application No. GB 1308950.3.

(Continued)

*Primary Examiner* — Mark Hellner
(74) *Attorney, Agent, or Firm* — Patent Portfolio Builders PLLC

(57) ABSTRACT

A method for deghosting seismic data collected with a seismic system, the seismic data being related to a subsurface of a body of water. The method includes receiving the seismic data recorded by detectors distributed along a variable-depth profile; calculating migrated ($d_1$) and mirror-migrated ($d_2$) gathers based on the seismic data, wherein the migrated and mirror-migrated gathers depend on a feature characterizing a configuration of the seismic system; applying a joint deconvolution model to the migrated and mirror-migrated gathers ($d_1$, $d_2$) to calculate a single deghosted gather (dg); and generating a final image of the subsurface based on the single deghosted gather (dg). The feature is not present in a gather after a step of stacking that is performed prior to generating the final image.

18 Claims, 9 Drawing Sheets

(56) References Cited

OTHER PUBLICATIONS

Hungarian Intellectual Property Office Search Report mailed Feb. 13, 2014, in related Singapore Application No. 201303816-1.
Hungarian Intellectual Property Office Examination Report mailed Feb. 13, 2014, in related Singapore Application No. 201303816-1.
R. Soubaras et al., "Deghosting by Joint Deconvolution of a Migration and a Mirror Migration", SEG Denver 2010 Annual Meeting, Oct. 16-21, 2010, pp. 3406-3410, SEG.
R. Soubaras et al., "Variable-Depth Streamer Acquisition: Broadband Data for Imaging and Inversion", SEG San Antonio Annual Meeting, Sep. 18-23, 2011, pp. 2364-2368, SEG.
R. Soubaras et al., "Variable-Depth Streamer Acquisition: Broadband Data for Imaging and Inversion", Geophysics, Mar. 21, 2013, pp. WA27-WS39, vol. 78, Geophysics.
R. Soubaras et al., "Pre-Stack Deghosting for Variable-Depth Streamer Data", SEG Las Vegas 2012 Annual Meeting, Nov. 4-9, 2012, pp. 1-5, SEG.

* cited by examiner

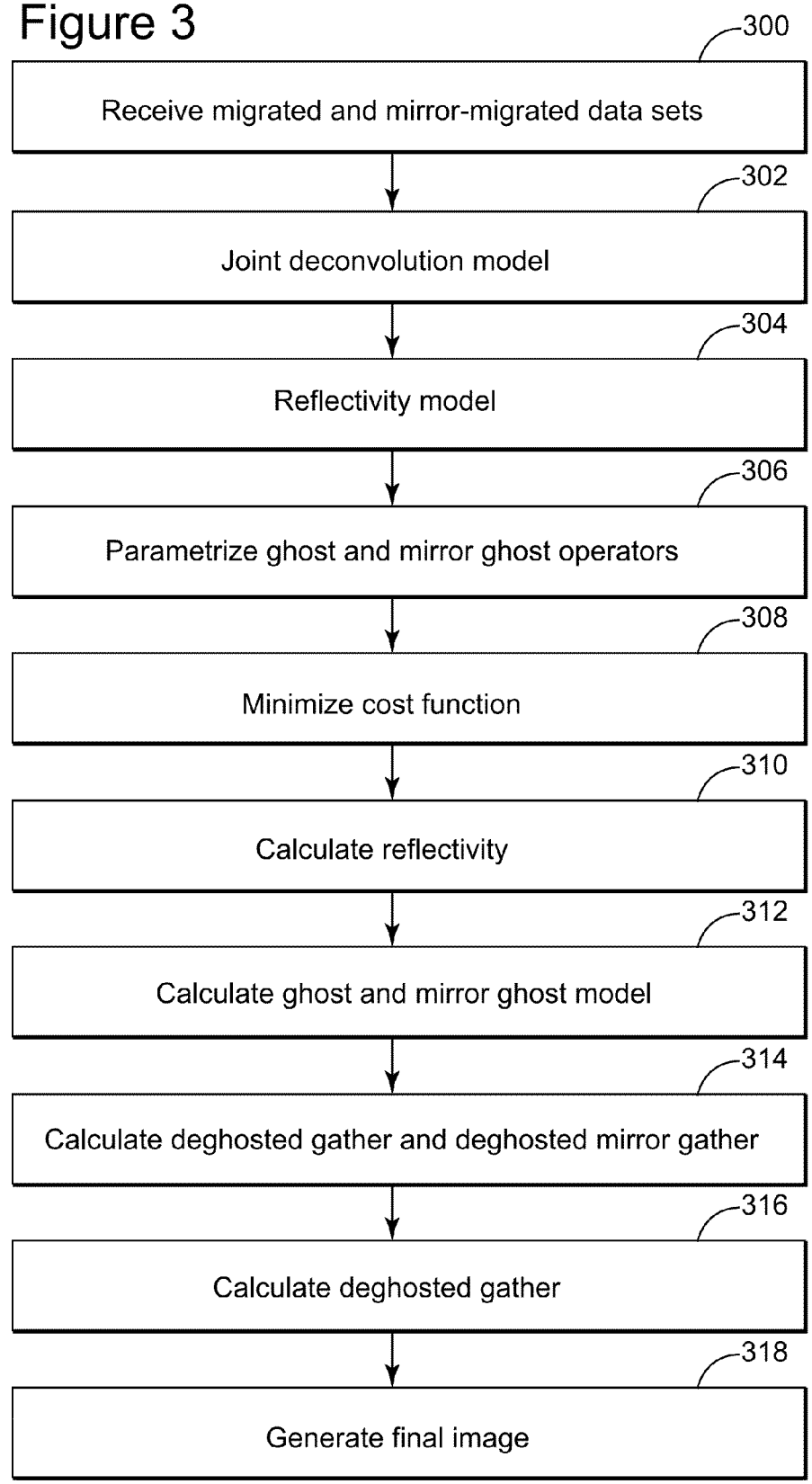

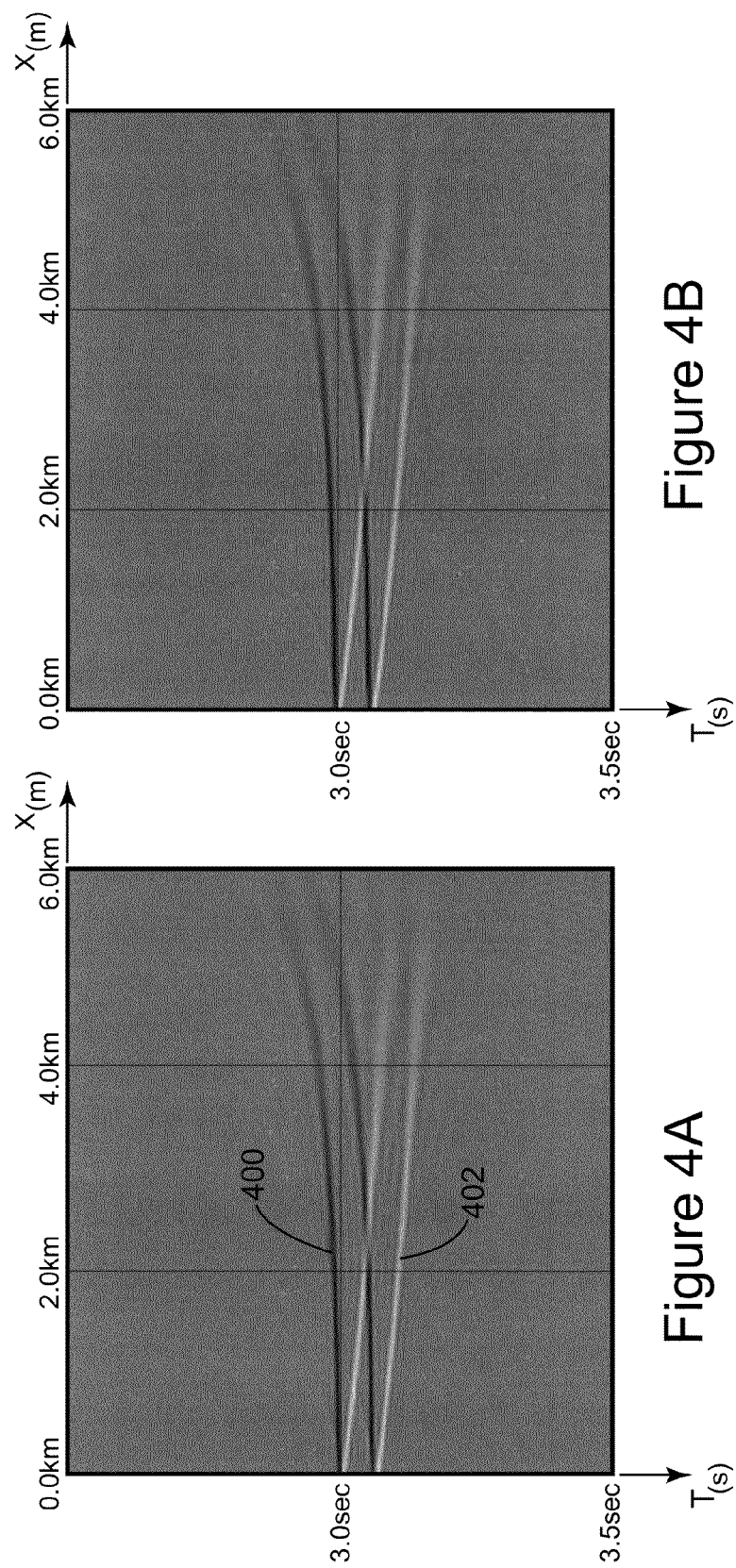

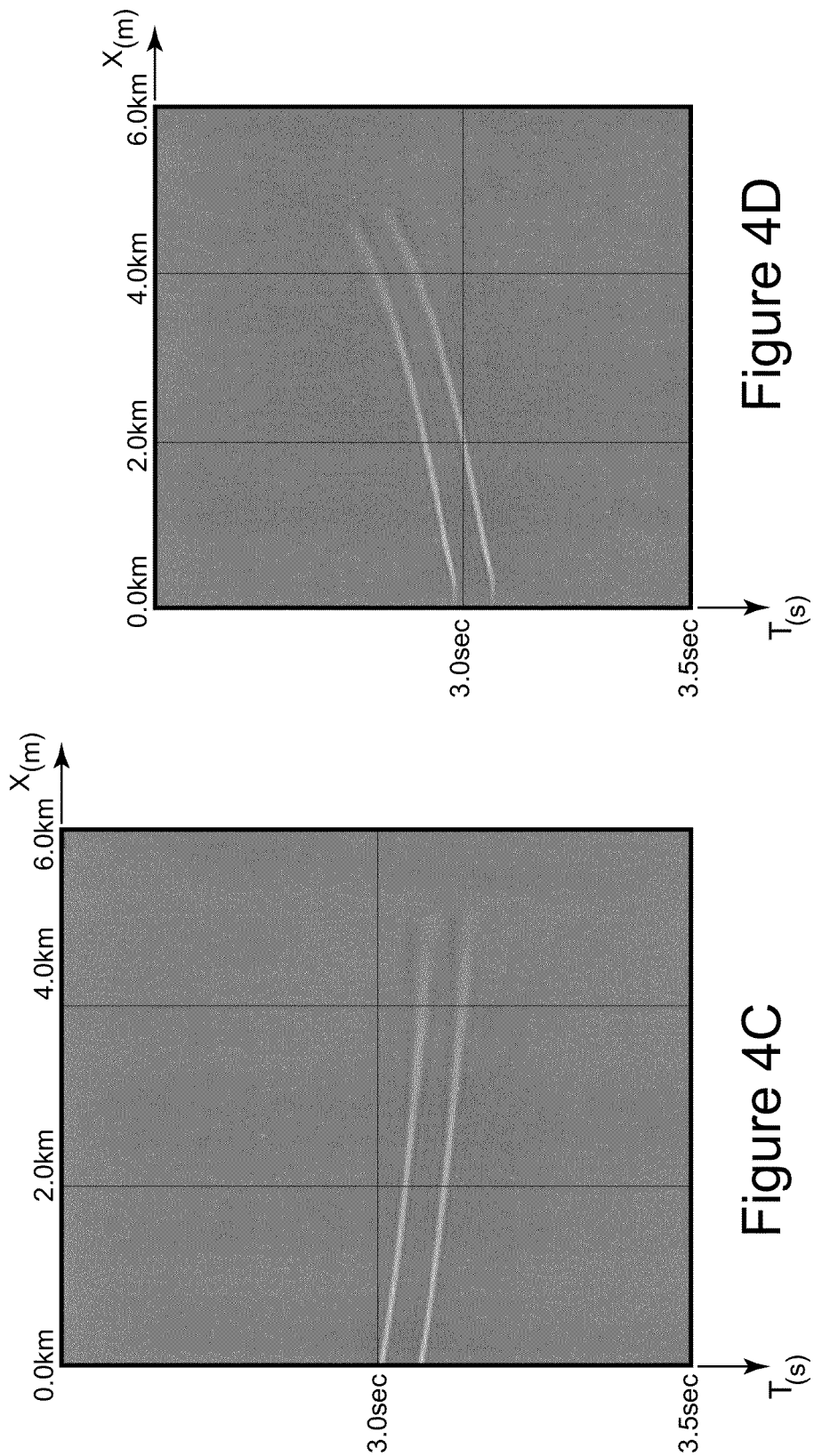

METHOD AND APPARATUS FOR PRE-STACK DEGHOSTING OF SEISMIC DATA

CROSS REFERENCE TO RELATED APPLICATIONS

The present application claims the benefit of priority under 35 U.S.C. §119(e) to U.S. Provisional Application No. 61/648,689 filed May 18, 2012. The entire content of this document is hereby incorporated by reference into the present application.

BACKGROUND

1. Technical Field

Embodiments of the subject matter disclosed herein generally relate to methods and systems and, more particularly, to mechanisms and techniques for deghosting seismic data acquired with a variable-depth streamer.

2. Discussion of the Background

Marine seismic data acquisition and processing generate an image of a geophysical structure (subsurface) under the seafloor. While this image/profile does not provide a precise location for oil and gas reservoirs, it suggests, to those trained in the field, the presence or absence of oil and/or gas reservoirs. Thus, providing a high-resolution image of the subsurface is an ongoing process for the exploration of natural resources.

During a seismic gathering process, as shown in FIG. 1, a vessel 10 tows plural detectors 12 disposed along a cable 14. Cable 14 together with its corresponding detectors 12 are sometimes referred to by those skilled in the art as a streamer 16. The vessel 10 may tow plural streamers 16 simultaneously. The streamers may be disposed horizontally, i.e., lying at a constant depth $z_1$ relative to the surface 18 of the ocean. Also, the plural streamers 16 may form a constant angle (i.e., the streamers may be slanted) with respect to the surface of the ocean as disclosed in U.S. Pat. No. 4,992,992, the entire content of which is incorporated herein by reference. FIG. 2 shows such a configuration in which all the detectors 12 are distributed along a slanted straight line 14 that makes a constant angle $\alpha$ with a reference horizontal line 30.

With reference to FIG. 1, the vessel 10 also tows a seismic source 20 configured to generate an acoustic wave 22a. Acoustic wave 22a propagates downward and penetrates the seafloor 24, eventually being reflected by a reflecting structure 26 (reflector). Reflected acoustic wave 22b propagates upward and is detected by detector 12. For simplicity, FIG. 1 shows only two paths 22a corresponding to the acoustic wave. However, the acoustic wave emitted by source 20 may be substantially a spherical wave, e.g., it propagates in all directions starting from the source 20. Some of reflected acoustic waves 22b (primary) are recorded by the various detectors 12 (the recorded signals are called traces) while some reflected waves 22c pass detectors 12 and arrive at the water surface 18. Because the interface between the water and air is well approximated as a quasi-perfect reflector (i.e., the water surface acts as a mirror for the acoustic waves), reflected wave 22c is reflected back toward detector 12 as shown by wave 22d in FIG. 1. Wave 22d is normally referred to as a ghost wave because it is due to a spurious reflection. Ghosts are also recorded by detector 12, but with a reverse polarity and a time lag relative to primary wave 22b. The degenerative effect the ghost arrival has on seismic bandwidth and resolution is known. In essence, interference between primary and ghost arrivals causes notches, or gaps, in the frequency content the detectors record.

The traces may be used to determine the subsurface (i.e., earth structure below surface 24) and to determine the position and presence of reflectors 26. However, ghosts disturb the accuracy of the final image of the subsurface and, for at least this reason, various methods exist for removing ghosts, i.e., deghosting, from the results of a seismic analysis.

However, most existing methods are designed for handling seismic data recorded with horizontal streamers, i.e., seismic data collected at the same depth (datum) relative to the ocean surface. Recent developments require that processing methods handle seismic data collected with curved and/or slanted streamers, i.e., seismic data collected by receivers located at variable depths.

Accordingly, it would be desirable to provide systems and methods for 3D seismic processing which allow imaging of the subsurface geology based on marine seismic data recorded at different water depths.

SUMMARY

According to an exemplary embodiment, there is a method for deghosting seismic data collected with a seismic system. The method includes receiving the seismic data recorded by detectors distributed along a variable-depth profile; calculating migrated ($d_1$) and mirror-migrated ($d_2$) gathers based on the seismic data, wherein the migrated and mirror-migrated gathers depend on a feature characterizing a configuration of the seismic system; applying a joint deconvolution model to the migrated and mirror-migrated gathers ($d_1$, $d_2$) to calculate a single deghosted gather (dg); and generating a final image of the subsurface based on the single deghosted gather (dg). The feature is not present in a gather after a step of stacking that is performed prior to generating the final image.

According to another exemplary embodiment, there is a computing device for deghosting seismic data collected with a seismic system, the seismic data being related to a subsurface of a body of water. The computing device includes an an interface for receiving the seismic data recorded by detectors distributed along a variable-depth profile; and a processor connected to the interface. The processor is configured to calculate migrated ($d_1$) and mirror-migrated ($d_2$) gathers based on the seismic data, wherein the migrated and mirror-migrated gathers depend on a feature characterizing a configuration of the seismic system, apply a joint deconvolution model to the migrated and mirror-migrated gathers ($d_1$, $d_2$) to calculate a single deghosted gather (dg), and generate a final image of the subsurface based on the single deghosted gather (dg). The feature is not present in a gather after a step of stacking that is performed prior to generating the final image.

According to still another exemplary embodiment, there is a non-transitory computer readable medium including computer executable instructions, wherein the instructions, when executed by a computer, implement the above discussed method.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 3 is a flowchart of a method for pre-stack deghosting according to an embodiment;

FIG. 4A illustrates a migrated gather;

FIG. 4B illustrates a mirror migrated gather;

FIG. 4C illustrates a ghost model;

FIG. 4D illustrates a mirror ghost model;

DETAILED DESCRIPTION

Figure 1:
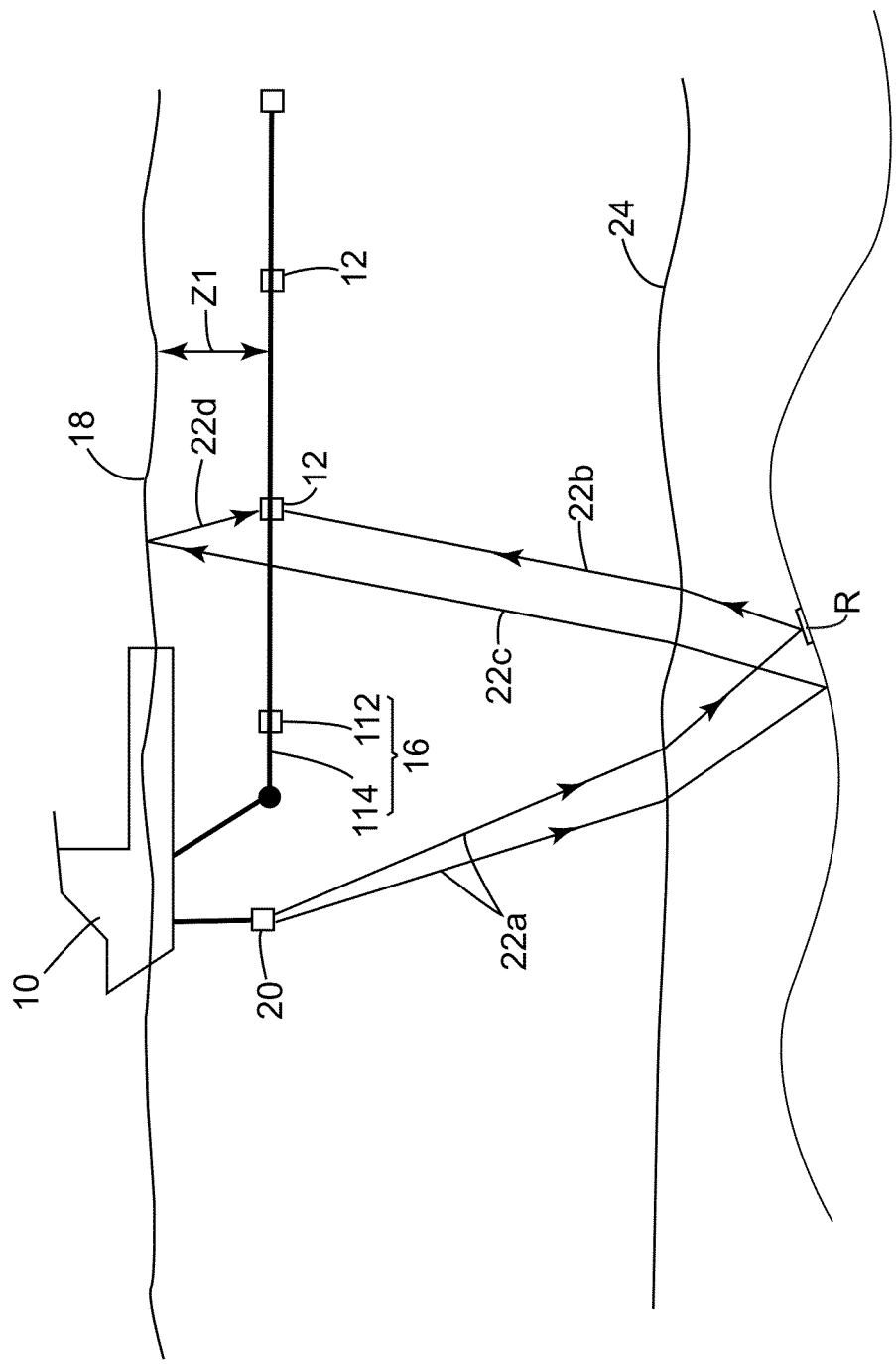
FIG. 1 is a schematic diagram of a conventional seismic data acquisition system having a horizontal streamer.
Figure 2:
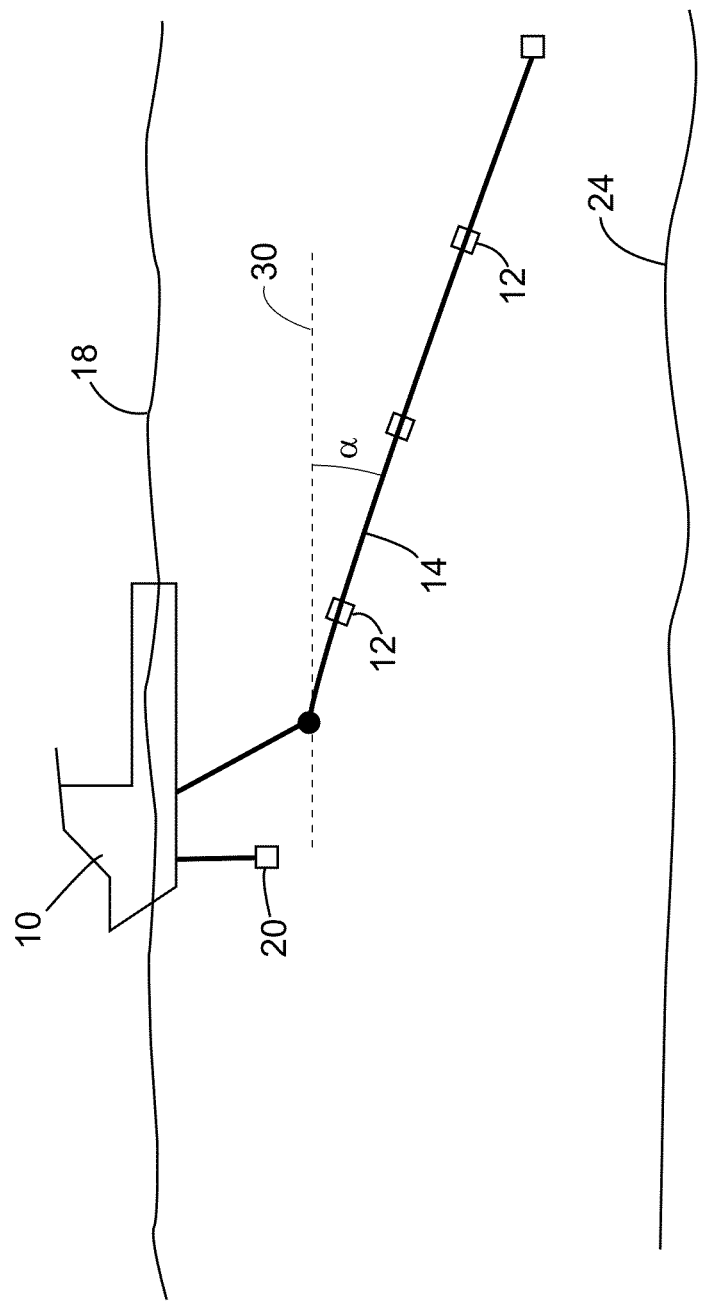
FIG. 2 is a schematic diagram of a conventional seismic data acquisition system having a slanted streamer.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a method for pre-stack deghosting of variable-depth seismic data based on joint deconvolution of migration data and mirror migration data. However, the embodiments to be discussed next are not limited to these processes, but may be applied to other processes used for processing seismic data or other data related to determination of the position of a structure that is not directly reachable for measurements.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for deghosting seismic data collected with a seismic system. The method calculates migrated and mirror-migrated gathers based on recorded seismic data, wherein the migrated and mirror-migrated gathers depend on a feature characterizing a configuration of the seismic system, then apply a joint deconvolution model to the migrated and mirror-migrated gathers to calculate a single deghosted gather; and generate a final image of the subsurface based on the single deghosted gather. The feature is not present in a gather after a step of stacking that is performed prior to generating the final image.

According to yet another exemplary embodiment, the seismic data that is processed is collected using streamers having a curved profile, i.e., part of the detectors are not provided on a slanted streamer, although the detectors have varying depths relative to the surface of the water. These kinds of streamers were disclosed in French filed Patent Application Serial No. FR1052576, entitled, "Method and Device to Acquire Marine Seismic Data," the entire content of which is incorporated herein by reference, and also in U.S. patent application Ser. No. 13/272,428 (herein '428), filed on Oct. 13, 2011, and entitled, "Method and Device to Acquire Seismic Data," the entire content of which is incorporated herein by reference.

According to another exemplary embodiment, a novel pre-stack deghosting method is adapted to any broadband acquisition technique. Before discussing the details of the novel pre-stack method, an overview of a post-stack deghosting method is in order. The method relies on data migration as well as data mirror migration. The method performs a joint deconvolution of these two datasets as discussed next. A mirror migration is referred to as a process that migrates data from a duplicate set of receivers (virtual set of receivers) that are mirrored above the surface relative to the actual set of receivers.

In conventional migration, primary events are stacked, while imperfectly stacked ghost events are present in the form of a causal residual ghost wavelet (i.e., lagging the primaries). Conversely, in the mirror migration, ghost events are stacked with their polarity reversed, whilst imperfectly stacked primary events are present in the form of an anti-causal residual wavelet (i.e., the residual primaries precede the well-imaged ghosts).

More specifically, a method for post-stack deghosting based on joint deconvolution of migration and mirror-migration datasets can be mathematically expressed as:

$$d_1(t) = g_{min}(t) * r(t)$$

$$d_2(t) = g_{max}(t) * r(t), \quad (1)$$

where $d_1(t)$ represents a migrated trace, $d_2(t)$ represents a mirror-migrated trace, $g_{min}(t)$ is a causal operator (or in a more restricted sense, a minimum-phase operator) representing the residual ghost of the migration, $g_{max}(t)$ is an anti-causal operator (or in a more restricted sense, a maximum-phase operator) representing the residual ghost of the mirror migration, r(t) is the reflectivity of the surveyed subsurface, and "*" represents the convolution operation.

This dual imaging of the same reflectivity r(t) with two different viewpoints (i.e., $g_{min}$ and $g_{max}$) is used to extract the true amplitude of deghosted migration. This can be considered a binocular vision of the reflectivity with the conventional migration image "colored" by a normalized minimum phase distortion, and the mirror-migration image "colored" by a normalized maximum phase distortion. To recover the reflectivity in "true color" (i.e., without distortion), a joint minimum phase, maximum phase deconvolution is applied on the migration and mirror-migration datasets.

Unlike conventional deconvolution, this is a well-posed mathematical problem, which means it has a unique solution, even when the operators have perfect spectral notches. Therefore, there is no requirement for the usual assumption that the reflectivity is white; the amplitude spectrum of the reflectivity remains arbitrary.

The joint deconvolution deghosting technique based on migrated and mirror-migrated datasets is well suited for variable depth streamer acquisition. The technique is fully 3D because it makes no 2D assumptions and has no limitations in the cross-line direction, making it suitable for wide-azimuth as well as 3D surveys.

The above-discussed method may be adapted to pre-stack deghosting. A migrated gather, before stacking, has an extra dimension due to the offset h, or another dimension, e.g., angle. Offset h represents a horizontal distance between the seismic source and a receiver that records the seismic wave generated by the seismic source. Thus, according to an embodiment illustrated in FIG. 3, a novel pre-stack deghosting method includes a step 300 of receiving migrated and mirror-migrated datasets. In one application, the recorded seismic data is processed to generate the mirror dataset and the mirror-migrated dataset. A joint deconvolution model is set up in step 302 for each offset h. The joint deconvolution model may be written as follows:

$$d_1(t,h) = g_{min}(t,h) * r(t,h)$$

$$d_2(t,h) = g_{max}(t,h) * r(t,h), \quad (2)$$

where the operation "*" is a convolution in the t domain, $d_1(t, h)$ is the migrated gather, $d_2(t, h)$ is the mirror-migrated gather, $g_{min}(t, h)$ is the causal ghost for offset h, $g_{max}(t, h)$ is the anti-causal mirror ghost for offset h, and $r(t, h)$ is the reflectivity associated with the surveyed subsurface. Note that each operator and gather now depends on the offset h. A model for the reflectivity may be set up in step 304, for example, as a sum of functions $T_i(h)$ that depend on the offset h but not on time t. The sum may also include time-dependent coefficients $a_i(t)$ as follows:

$$r(t, h) = \sum_{i=0}^{p} a_i(t) T_i(h), \quad (3)$$

where $T_i(h)$ is, for example, a set of polynomials or orthogonal polynomials, and p is a user-defined number.

Operators $g_{min}(t, h)$ and $g_{max}(t, h)$ may take different parametric forms, and one of them is selected in step 306. For example, one parametric form for the causal and anti-causal operators is given by:

$$g_{min}(t,h) = 1 - d(t - \Delta t_h)$$

$$g_{max}(t,h) = 1 - d(t + \Delta t'_h), \quad (4)$$

where $d(t-\Delta t_h)$ is a function realizing the delay operator $\Delta t_h$ over a certain bandwidth, and the time delays $\Delta t_h$ and $\Delta t'_h$ are positive numbers.

Another parametric form for operators $g_{min}(t, h)$ and $g_{max}(t, h)$ may be given by gapped operators having the active part depending on offset. For this parameterization, the active part (non-zero samples) of the causal operator $g_{min}(t, h)$ may be given by time samples $m_h - l_h$ to $m_h + l_h$, and the active part of the anti-causal operator $g_{max}(t, h)$ may be given by time samples $-n_h + l_h$ to $-n_h - l_h$ according to the following equation:

$$g_{min}(t, h) = 1 - \sum_{k=m_h-l_h}^{m_h+l_h} g_{k,h} \delta(t - k dt)$$

$$g_{max}(t, h) = 1 - \sum_{k=n_h-l_h}^{n_h+l_h} g_{k,h} \delta(t + k dt), \quad (5)$$

where $\delta(t-ndt)$ is 1 if t is the $n^{th}$ sample ndt, or 0 otherwise.

As a special case, the constraint $g_{max}(t, h) = g_{min}(-t, h)$ can be imposed on this model. The coefficients $a_i(t)$ in equation (3) and operators $g_{min}(t, h)$, $g_{max}(t, h)$ having the form represented by equations (4) or (5) may be found by minimizing a cost function C in step 308. The cost function C may be defined as:

$$C(a_i, g_{min}, g_{max}) = \sum_{t,h} M(t, h) \left[ d_1(t, h) - g_{min}(t, h) * \sum_{i=0}^{p} a_i(t) T_i(h) \right]^2 + \quad (6)$$

-continued $$\sum_{t,h} M(t, h) \left[ d_2(t, h) - g_{max}(t, h) * \sum_{i=0}^{p} a_i(t) T_i(h) \right]^2$$

where $M(t, h)$ is a mute function that is commonly used in gather processing for muting various data, e.g., noise. Note that the cost function includes a sum over all the times and all the offsets.

Once the coefficients $a_i(t)$ and operators $g_{min}(t, h)$, $g_{max}(t, h)$ are computed, the reflectivity $r(t, h)$ can be computed in step 310 by using equation (3), i.e., $$r(t, h) = \sum_{i=0}^{p} a_i(t) T_i(h).$$

Then, the ghost model $g_1(t, h)$ and the mirror ghost model $g_2(t, h)$ may be calculated in step 312, for each time t and offset h using equations:

$$g_1(t,h) = g_{min}(t,h) * r(t,h) - r(t,h)$$

$$g_2(t,h) = g_{max}(t,h) * r(t,h) - r(t,h). \quad (7)$$

A deghosted gather $dg_1(t, h)$ and a deghosted mirror gather $dg_2(t, h)$ may then be computed in step 314 by subtracting the ghost models from the original gathers, i.e., by calculating:

$$dg_1(t,h) = d_1(t,h) - g_1(t,h)$$

$$dg_2(t,h) = d_2(t,h) - g_2(t,h). \quad (8)$$

The above step 314 of subtraction may be replaced by an adaptive subtraction. Once the deghosted gather $dg_1$ and deghosted mirror gather $dg_2$ are computed, it is possible to compute a single deghosted gather dg for offset h and time t in step 316 by using equation:

$$dg(t, h) = \frac{dg_1(t, h) + dg_2(t, h)}{2}. \quad (9)$$

Then, the deghosted gathers are stacked so dependency on the offset h is removed and other processing techniques may be applied to generate a final image, in step 318, of the surveyed subsurface.

Figure 4E:
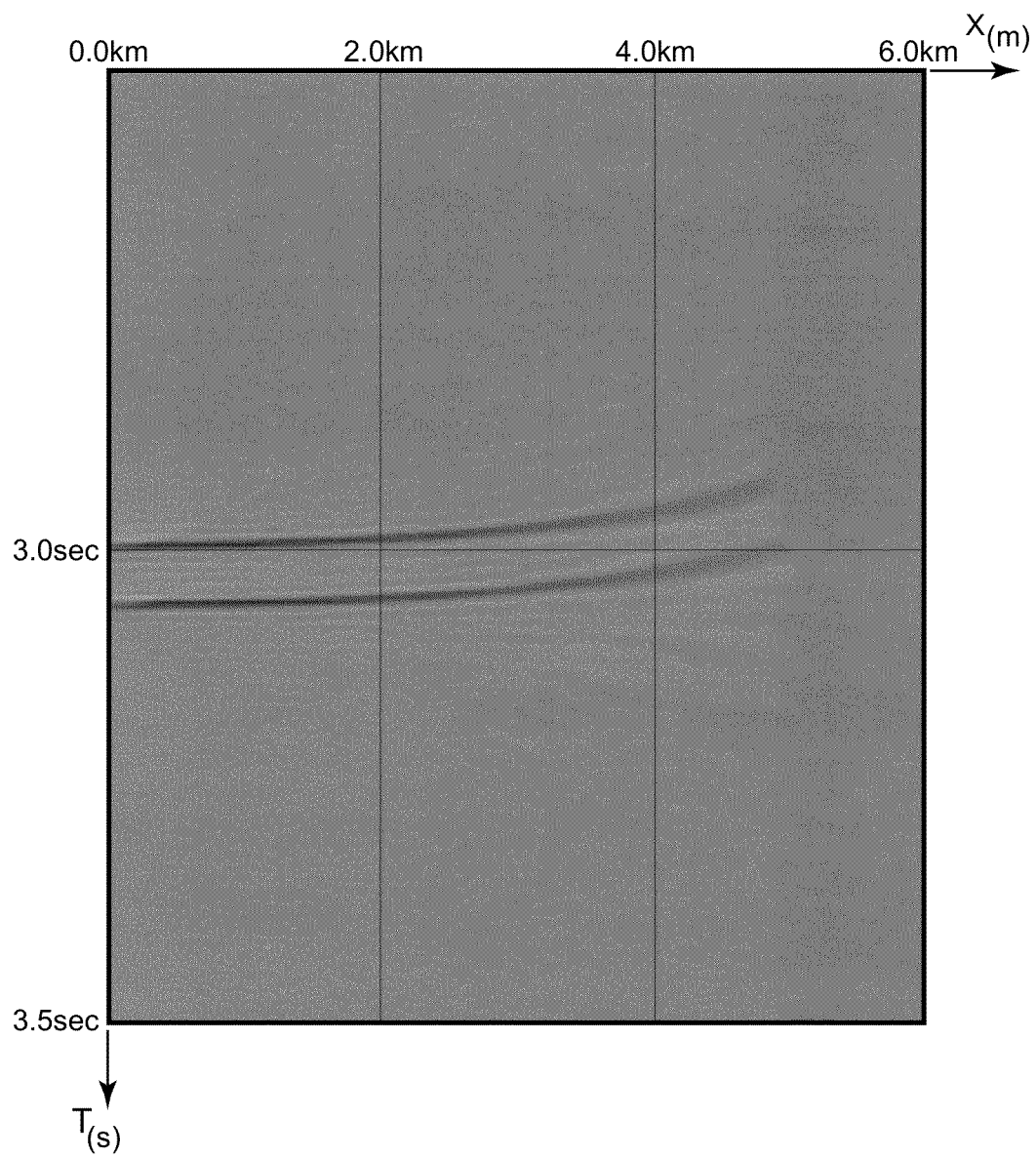
FIG. 4E illustrates a deghosted gather.

By taking a set of synthetic seismic data and using the algorithms discussed above with regard to FIG. 3, the following quantities have been calculated. FIG. 4A illustrates migrated gather $d_1$ that includes primary 400 and ghost 402, FIG. 4B illustrates the mirror-migrated gather $d_2$, FIG. 4C illustrates ghost model $g_1$ calculated based on equation (7), FIG. 4D illustrates mirror ghost model $g_2$ calculated based also on equation (7), and FIG. 4E illustrates the deghosted gather dg calculated based on equation (9).

Figure 5:
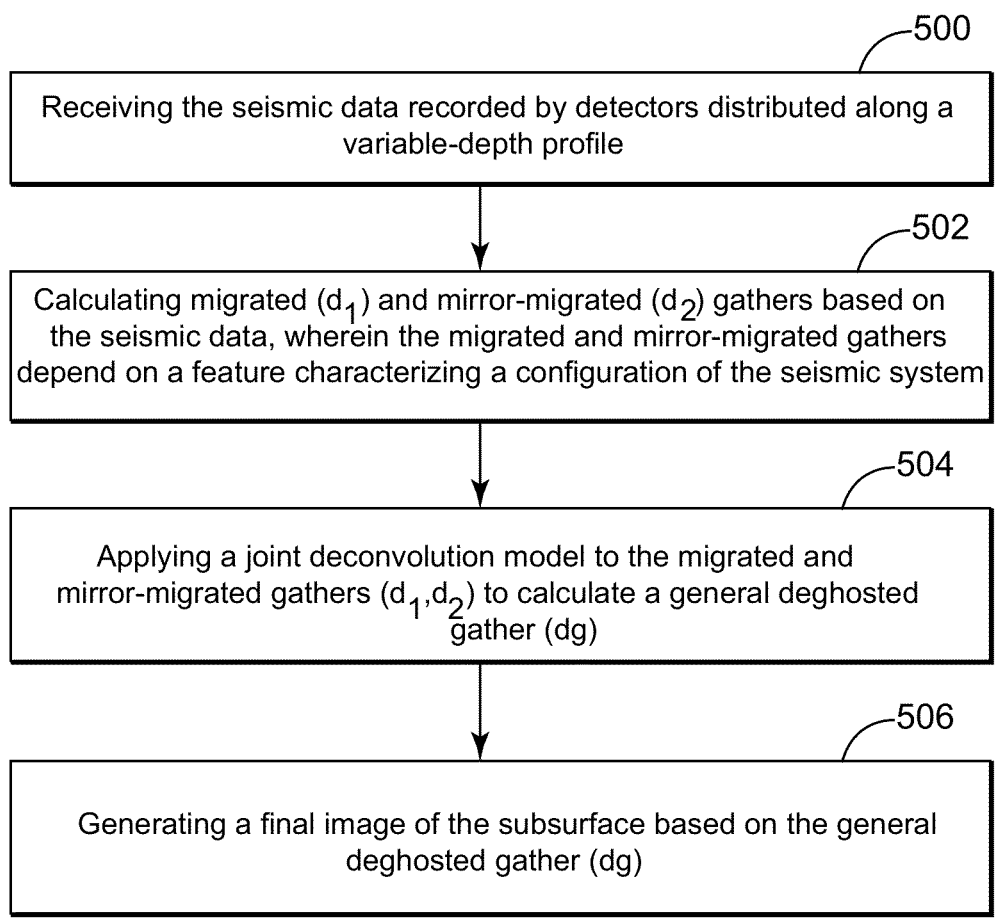
FIG. 5 is a flowchart of another method for pre-stack deghosting according to an embodiment.

The above algorithm may be implemented as a method as now discussed with regard to FIG. 5. A method for deghosting seismic data collected with a seismic system includes a step 500 of receiving the seismic data recorded by detectors distributed along a variable-depth profile, a step 502 of calculating migrated ($d_1$) and mirror-migrated ($d_2$) gathers based on the seismic data, wherein the migrated and mirror-migrated gathers depend on a feature characterizing a configuration of the seismic system, a step 504 of applying a joint deconvolution model to the migrated and mirror-migrated gathers ($d_1$, $d_2$) to calculate a single deghosted gather (dg), and a step 506 of generating a final image of the subsurface based on the single deghosted gather (dg). The feature is not present in a gather after a step of stacking that is performed prior to generating the final image.

The process of gathering marine seismic data has been discussed in '428 and, thus, this process is not repeated herein. Further, the above-identified patent application identified the possibility of gathering data not only by using traditional streamers, i.e., the detectors lying along horizontal lines or along a slanted line, but also by using novel streamers in which part of the detectors may lie on a curved profile (variable depths) or streamers that have multiple slanted sections. Furthermore, the seismic data may be collected with independent nodes that are either attached to the ocean bottom or are floating in the water. For example, it is possible to have plural autonomous underwater vehicles (AUVs) that are located on a curved profile while stationary or moving in water and recording seismic data.

Figure 6:
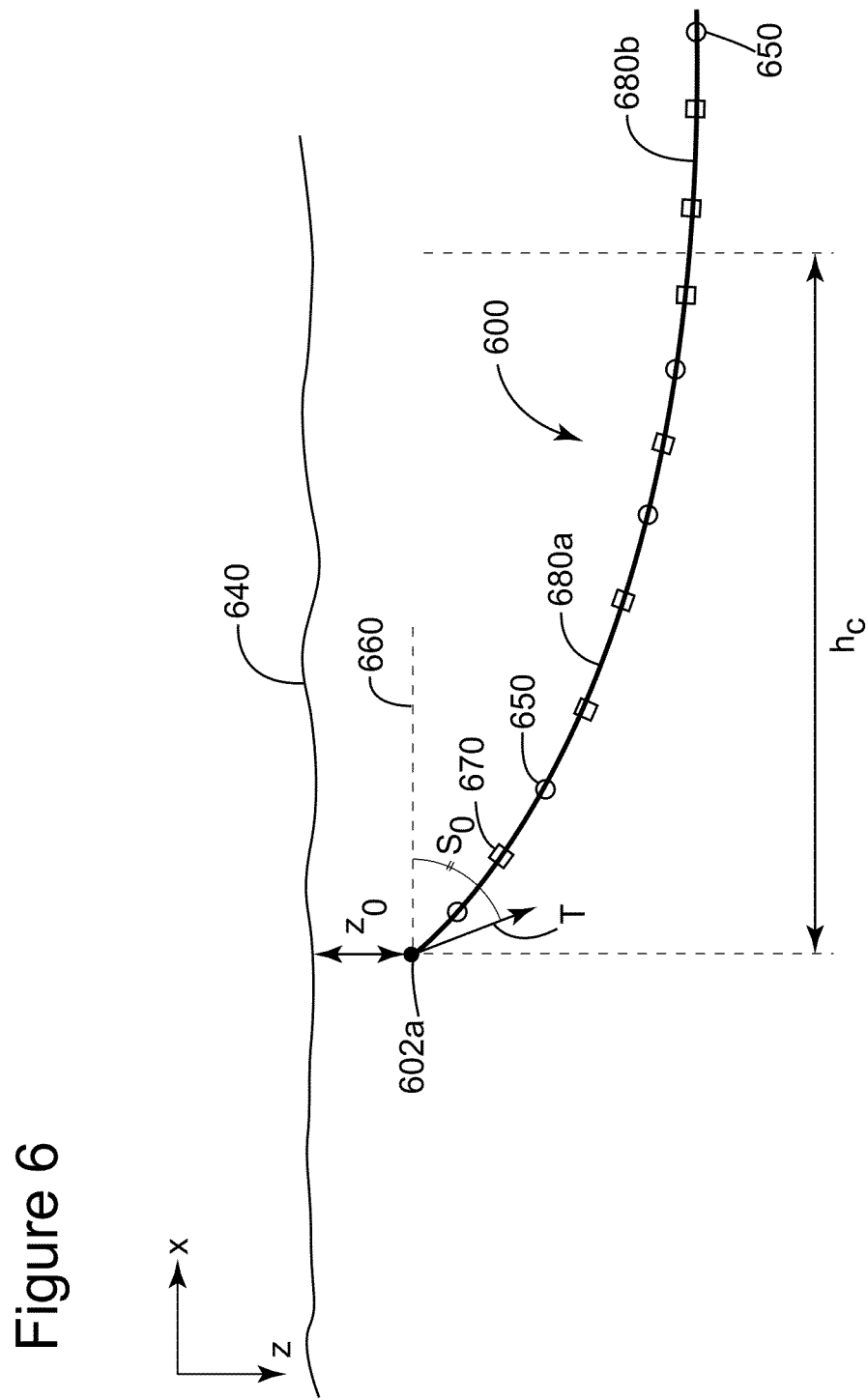
FIG. 6 is a schematic diagram of a variable-depth streamer.

A variable-depth streamer is illustrated in FIG. 6, in which a streamer 600 has a parameterized, variable-depth profile defined by three parametric quantities, $z_0$, $s_0$ and $h_c$. Note that the entire streamer does not have to have the curved profile. In other words, the curved profile should not be construed to always apply to the entire length of the streamer. While this situation is possible, the exemplary embodiments do not prohibit having the curved profile applied to only a portion of the streamer. The first parameter $z_0$ indicates the depth of the first detector 620a relative to the surface 640 of the water. This parameter may have a value in the range of meters to tens of meters. For example, $z_0$ may be around 6 m. However, as would be recognized by those skilled in the art, the value of $z_0$ depends on each application and may be related to the depth of the ocean bottom, the depth of the reflectors, the power of the sound source, etc.

The second parameter $s_0$ is related to the slope of the initial part of the streamer 680a relative to a horizontal line 660. The angle $s_0$ is illustrated in FIG. 6 and it is determined by a tangent T to an initial part of the streamer and the horizontal line 660. Note that the slope of the curved profile at point 620a is given by a ratio of the change of the curved profile along the Z axis with respect to the change along the X axis. The slope is thus equal to the mathematical value of the tangent of the angle $s_0$, i.e., slope (at point 620a in FIG. 6)=tan($s_0$). Further, note that for small angles (e.g., five or less degrees), tan($s_0$) is approximately equal to $s_0$, if the angle is expressed in radians and not in degrees. Thus, for small angles, the slope and the angle may be used interchangeably. In one embodiment, the value of $s_0$ may be between 0 and 6 degrees. The example shown in FIG. 6 has an initial angle $s_0$ equal to substantially 3 degrees. Note that the profile of the streamer 600 in FIG. 6 is not drawn to scale, because an angle of 3 degrees is a relatively small quantity.

The third parameter $h_c$ indicates a horizontal length (distance along the X axis in FIG. 6 measured from the first detector 620a) of the curved portion of the streamer. This parameter may be in the range of hundreds to thousands of meters. For example, $h_c$ is around 3,000 m for the configuration shown in FIG. 6. This parameter defines the end of the curved part of the streamer 600. In other words, the streamer 600 may have a first portion 680a that has a first curved profile and a second portion 680b that is either flat or has a different curved profile. Parameter $h_c$ defines the first portion 680a. Note that in one application the streamer 600 has both the first portion 680a and the second portion 680b, while in another application the streamer 600 has only the first portion 680a. In other words, in some embodiments, the streamer does not extend along the entire curved profile, i.e., a length of the streamer projected on X axis is less than $h_c$.

Plural birds 650 are distributed along the streamer for achieving the desired curved profile. According to another exemplary embodiment, the curved profile of the streamer 600 may be described, approximately, by the following equations:

$$z(h) = z_0 + s_0 h\left(1 - 0.5\left(\frac{h}{h_c}\right)\right) \text{ for } h \leq h_c, \quad (1)$$

and $$z(h) = z_0 + s_0 \cdot 0.5 \cdot h_c \text{ for } h > h_c. \quad (2)$$

In these equations, z is measured along the Z axis, and h is measured along the X axis, where Z is perpendicular to the surface of the water and X extends along the surface of the water. Also, it is noted that only equation (1) may be enough to define the shape of the streamer, depending on the length of the streamer. In other words, in some embodiments, the streamer does not have to have the flat portion. For these specific equations, it was found that the clarity of the images of the sub-surface improves substantially. Those skilled in the art would understand that the values provided by equations (1) and (2) are approximate because the detectors 670 are under constant motion exerted by various water currents and the movement of the vessel. In other words, it is understood that detectors provided substantially on the curved profile described by equation (1) and/or (2), e.g., at positions as close as 10 to 20% to the real curve in terms of the actual depth z(h), are envisioned to be covered by the above-mentioned equations. The same is true for birds 650 configured to maintain the curved profile, which may be one of a parabola, a circle, a hyperbola or a combination of these shapes. Once the parameterized curve associated with the desired curved profile is selected, corresponding depths of the bird 650 are calculated and, when the seismic survey is started, those depths are programmed or transmitted to the birds so that they maintain those depths during the seismic survey. In this way, the desired curved profile is achieved and maintained during the seismic survey.

Although the curved profile streamer discussed above provides better results than the existing streamer profiles, the processing discussed in the previous embodiments equally applies to traditional streamer profiles (e.g., horizontal, slanted).

Figure 7:
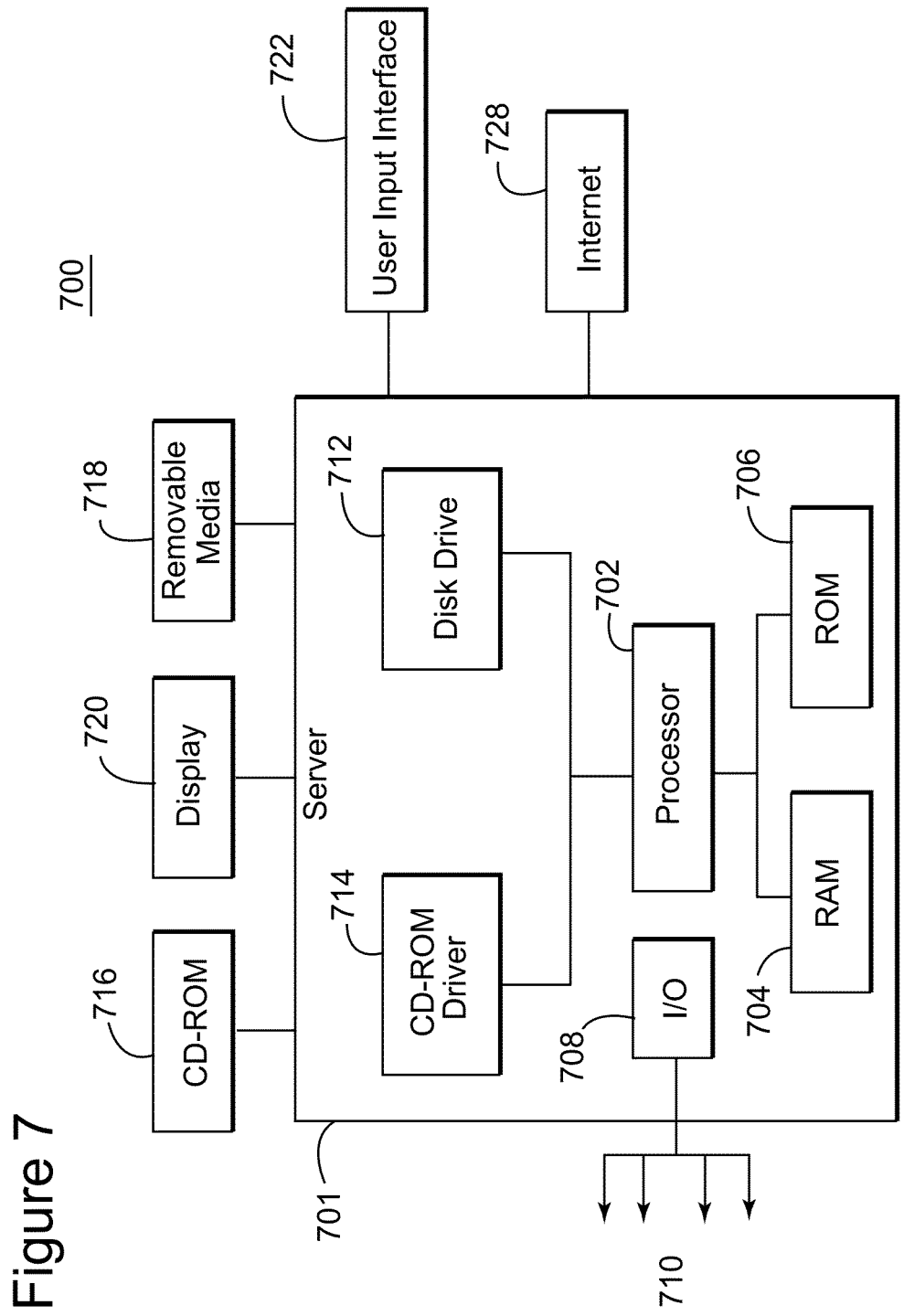
FIG. 7 is a schematic diagram of a processing apparatus configured to perform a novel method according to an exemplary embodiment.

The above-discussed procedures and methods may be implemented in a processing apparatus illustrated in FIG. 7. Hardware, firmware, software or a combination thereof may be used to perform the various steps and operations described herein. The processing apparatus 700 of FIG. 7 is an exemplary computing structure that may be used in connection with such a system.

The exemplary processing apparatus 700 suitable for performing the activities described in the exemplary embodiments may include a server 701. Such a server 701 may include a central processor (CPU) 702 coupled to a random access memory (RAM) 704 and to a read-only memory (ROM) 706. ROM 706 may also be other types of storage media to store programs, such as programmable ROM (PROM), erasable PROM (EPROM), etc. Processor 702 may communicate with other internal and external components through input/output (I/O) circuitry 708 and bussing 710, to provide control signals and the like. Processor 702 carries out a variety of functions as are known in the art, as dictated by software and/or firmware instructions.

Server 701 may also include one or more data storage devices, including hard disk drives 712, CD-ROM drives 714, and other hardware capable of reading and/or storing information such as DVD, etc. In one embodiment, software for carrying out the above-discussed steps may be stored and distributed on a CD-ROM 716, diskette 718 or other form of media capable of portably storing information. These storage media may be inserted into, and read by, devices such as CD-ROM drive 714, disk drive 712, etc. Server 701 may be coupled to a display 720, which may be any type of known display or presentation screen, such as LCD, plasma display, cathode ray tubes (CRT), etc. A user input interface 722 is provided, including one or more user interface mechanisms such as a mouse, keyboard, microphone, touch pad, touch screen, voice-recognition system, etc.

Server 701 may be coupled to other devices, such as sources, detectors, etc. The server may be part of a larger network configuration as in a global area network (GAN) such as the Internet 728, which allows ultimate connection to various landline and/or mobile computing devices.

The disclosed exemplary embodiments provide an apparatus and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for deghosting seismic data collected with a seismic system, the seismic data being related to a subsurface of a body of water, the method comprising:
   receiving the seismic data recorded by detectors distributed along a variable-depth profile;
   calculating migrated ($d_1$) and mirror-migrated ($d_2$) gathers based on the seismic data, wherein the migrated and mirror-migrated gathers depend on time and a feature characterizing a configuration of the seismic system;
   applying pre-stack a joint deconvolution model to the migrated and mirror-migrated gathers ($d_1$, $d_2$) to calculate a single deghosted gather (dg);
   stacking the single deghosted gather (dg) to remove the feature; and
   generating a final image of the subsurface based on the stacked single deghosted gather (dg).

2. The method of claim 1, wherein the feature is an offset between a seismic source of the seismic system and the detectors.

3. The method of claim 1, wherein the feature is an angle of an incident wave to a corresponding detector.

4. The method of claim 1, wherein the step of applying a deconvolution model comprises:
   defining a reflectivity (r) as a sum of a set of polynomials ($T_i$) multiplied by corresponding coefficients ($a_i$);
   parameterizing ghost ($g_{min}$) and mirror ghost ($g_{max}$) operators;
   defining a cost function (C) based on the reflectivity (r) and the ghost ($g_{min}$) and mirror ghost ($g_{max}$) operators; and
   minimizing the cost function (C) to determine the coefficients ($a_i$) and the ghost ($g_{min}$) and mirror ghost ($g_{max}$) operators.

5. The method of claim 4, further comprising:
   calculating the reflectivity (r); and
   calculating a ghost model ($g_1$) and a mirror ghost model ($g_2$),
   wherein the ghost model ($g_1$) is given by a convolution of the ghost operator ($g_{min}$) with the reflectivity (r) and then subtracting the reflectivity (r), and
   the mirror ghost model ($g_2$) is given by the convolution of the mirror ghost operator ($g_{max}$) with the reflectivity (r) and then subtracting the reflectivity (r).

6. The method of claim 5, wherein the ghost operator ($g_{min}$) is a causal, minimum-phase operator and the mirror ghost operator ($g_{max}$) is an anti-causal, maximum-phase operator.

7. The method of claim 5, further comprising:
   computing a deghosted gather ($dg_1$) based on the migrated gather ($d_1$) and the ghost model ($g_1$); and
   computing a deghosted mirror gather ($dg_2$) based on the mirror migrated gather ($d_2$) and the mirror ghost model ($g_2$).

8. The method of claim 7, further comprising:
   calculating the single deghosted gather (dg) based on the deghosted gather ($dg_1$) and the deghosted mirror gather ($dg_2$).

9. A computing device for deghosting seismic data collected with a seismic system, the seismic data being related to a subsurface of a body of water, the computing device comprising:
   an interface for receiving the seismic data recorded by detectors distributed along a variable-depth profile; and
   a processor connected to the interface and configured to,
   calculate migrated ($d_1$) and mirror-migrated ($d_2$) gathers based on the seismic data, wherein the migrated and mirror-migrated gathers depend on a feature characterizing a configuration of the seismic system,
   apply pre-stack a joint deconvolution model to the migrated and mirror-migrated gathers ($d_1$, $d_2$) to calculate a single deghosted gather (dg),
   stack the single deghosted gather (dg) to remove the feature, and
   generate a final image of the subsurface based on the stacked single deghosted gather (dg).

10. The computing device of claim 9, wherein the feature is an offset between a vessel of the seismic system and the detectors.

11. The computing device of claim 9, wherein the feature is an angle of an incident wave to a corresponding detector.

12. The computing device of claim 9, wherein the processor is further configured to:
   define a reflectivity (r) as a sum of a set of polynomials ($T_i$) multiplied by corresponding coefficients ($a_i$);

parameterize ghost ($g_{min}$) and mirror ghost ($g_{max}$) operators;

define a cost function (C) based on the reflectivity (r) and the ghost ($g_{min}$) and mirror ghost ($g_{max}$) operators; and minimize the cost function (C) to determine the coefficients ($a_i$) and the ghost ($g_{min}$) and mirror ghost ($g_{max}$) operators.

13. The computing device of claim 12, wherein the processor is further configured to:

calculate the reflectivity (r); and calculate a ghost model ($g_1$) and a mirror ghost model ($g_2$), wherein the ghost model ($g_1$) is given by a convolution of the ghost operator ($g_{min}$) with the reflectivity (r) and then subtracting the reflectivity (r), and the mirror ghost model ($g_2$) is given by the convolution of the mirror ghost operator ($g_{max}$) with the reflectivity (r) and then subtracting the reflectivity (r).

14. The computing device of claim 13, wherein the ghost operator ($g_{min}$) is a causal, minimum-phase operator and the mirror ghost operator ($g_{max}$) is an anti-causal, maximum-phase operator.

15. The computing device of claim 13, wherein the processor is further configured to:

compute a deghosted gather ($dg_1$) based on the migrated gather ($d_1$) and the ghost model ($g_1$); and compute a deghosted mirror gather ($dg_2$) based on the mirror migrated gather ($d_2$) and the mirror ghost model ($g_2$).

16. The computing device of claim 15, wherein the processor is further configured to:

calculate the single deghosted gather (dg) based on the deghosted gather ($dg_1$) and the deghosted mirror gather ($dg_2$).

17. A non-transitory computer readable medium including computer executable instructions, wherein the instructions, when executed by a computer, implement a method for deghosting seismic data collected with a seismic system, the seismic data being related to a subsurface of a body of water, the method comprising:

receiving the seismic data recorded by detectors distributed along a variable-depth profile;

calculating migrated ($d_1$) and mirror-migrated ($d_2$) gathers based on the seismic data, wherein the migrated and mirror-migrated gathers depend on a feature characterizing a configuration of the seismic system;

applying pre-stack a joint deconvolution model to the migrated and mirror-migrated gathers ($d_1$, $d_2$) to calculate a single deghosted gather (dg);

stacking the single deghosted gather (dg) to remove the feature; and generating a final image of the subsurface based on the single deghosted gather (dg).

18. The medium of claim 17, wherein the feature is an offset between a seismic source of the seismic system and the detectors or an angle of an incident wave to a corresponding detector.

* * * * *